Figure 1:
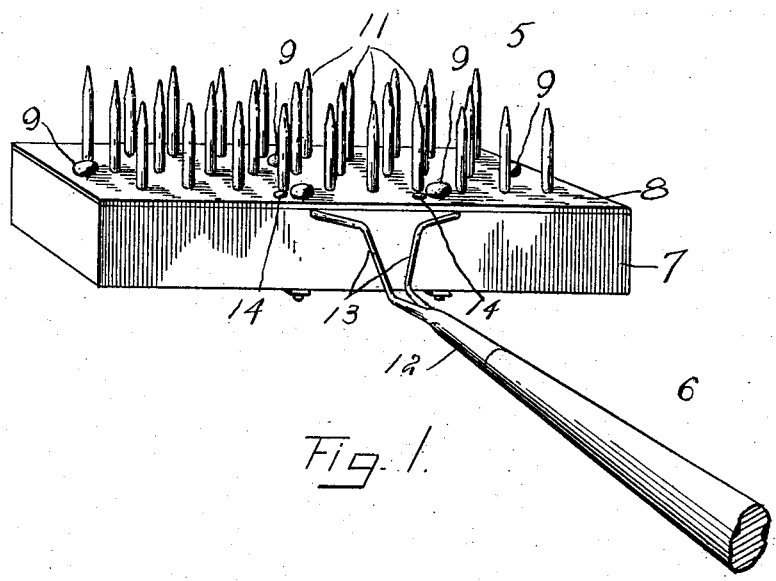

No. 889,656. PATENTED JUNE 2, 1908.
A. S. BURCKHALTER.
RAKE.
APPLICATION FILED OCT. 8, 1907.

Inventor
Ada S. Burckhalter.

UNITED STATES PATENT OFFICE.

ADA S. BURCKHALTER, OF BARNWELL, SOUTH CAROLINA.

RAKE.

No. 889,656.  Specification of Letters Patent.  Patented June 2, 1908.

Application filed October 8, 1907. Serial No. 396,519.

*To all whom it may concern:*

Be it known that I, ADA S. BURCKHALTER, a citizen of the United States, residing at Barnwell, in the county of Barnwell, State of South Carolina, have invented certain new and useful Improvements in Rakes; and I do hereby declare the following to be a full, clear, and exact description of the invention, such as will enable others skilled in the art to which it appertains to make and use the same.

The present invention has reference to rakes and it aims to provide an exceedingly simple, inexpensive, and durable article of that class in which the chief defect ordinarily present in such articles, i. e., the liability of the teeth to work out of their seats in the rake head and become lost, is completely avoided by the use of a re-inforcing plate of sheet metal which is bolted to the under face of the head and thus retains the heads of the teeth in place in their seats, the stems of the teeth passing through openings formed through the plates.

The invention further resides in the provision of a rake in which the head is formed of a solid block of wood, the weight of which is sufficient to carry the trash picked up by the teeth without the application of extra pressure upon the handle.

The invention will be readily understood from a consideration of the following detailed description, and its preferred embodiment is illustrated in the accompanying drawings in which like parts are designated by corresponding reference numerals in the several views.

Figure 2:
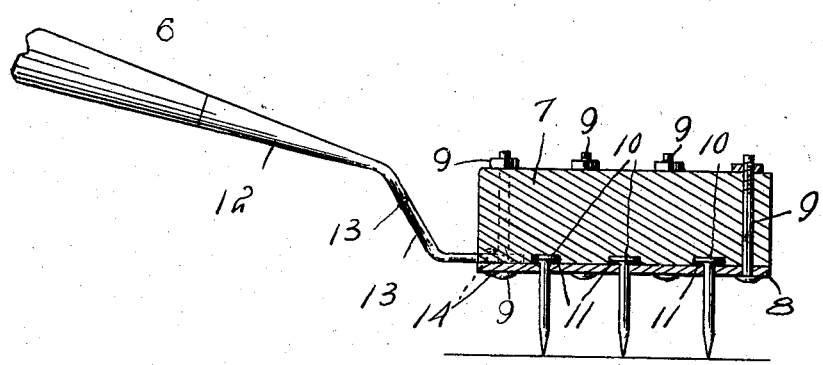

Of the said drawings:—Figure 1 is an inverted perspective view of a rake constructed in accordance with the present invention, and, Fig. 2 is a transverse section through the rake head, showing also a portion of the socket in which the handle is fitted.

In its practical embodiment, the rake comprises, generally, a head 5 and a handle 6, the former consisting of a solid block of wood 7 having a plate 8 of sheet iron attached to its under face, the fastening bolts 9 fitting in registering openings formed through the plate and block, the headed lower ends of the bolts bearing against the outer face of the plate, while their threaded upper ends which project above the upper face of the block are provided at such points with nuts. The plate and block are co-extensive in size, as shown.

The under face of the block is provided with a series of seats 10 which are formed therein and are adapted to receive the heads of the teeth 11 of the rake, the stems of which project through rows of openings formed through the plate 8. The diameter of the openings is about equal to that of the stems of the teeth. In the present instance three rows of teeth are made use of, and the plate openings for the teeth are located about one inch apart from each other. Wire nails having a length of about $3\frac{1}{2}$ inches are used for the teeth.

By reason of this construction, it will be apparent that any displacement of the teeth is positively prevented, owing to the fact that their heads are retained within the seats 10 by the plate 8 which is bolted fast to the under face of the block in which the seats are formed, the inner face of the plate being thus held in contact with the heads of the teeth, as shown in Fig. 2.

The rake handle has its lower end fitted in a metal socket 12 which is provided with a pair of integral arms 13, said arms diverging from each other and having their free ends interposed between the rear edges of the block and plate, to which latter they are riveted or otherwise secured at such point, as indicated by the numeral 14. Said arms are bent intermediate their ends so as to dispose the handle at the proper angle to the rake head.

From the foregoing, it will be apparent, as above stated, that the teeth are positively held against removal by means of the perforated plate 8, which latter also serves to increase the weight of the rake head, thus rendering the application of extra pressure upon the handle unnecessary. It will likewise be apparent that the rake can be manufactured at an exceedingly slight cost.

While three rows of teeth are shown in the present instance, it is to be understood that a greater or less number may be used, and also that the arrangement of the teeth in rows may be discarded and the teeth set in any desired relation with respect to each other.

What is claimed is:—

1. A rake including a head constructed of a solid block of wood having a series of seats formed in its under face, a sheet metal plate disposed against said face and provided with a series of openings registering with said seats, the diameter of the openings being less than that of the seats, a series of teeth having their heads fitted in said seats and their stems projecting through said openings, and fastening means extending through the block and plate for holding the same together, with the plate in contact with the under faces of the heads of the teeth.

2. A rake comprising, in combination, a head constructed of a solid block of wood having a series of seats formed in its under face, a sheet metal plate disposed against said face and provided with a series of openings registering with said seats, the diameter of the openings being less than that of the seats, a series of teeth having their heads fitted in said seats and their stems projecting through said openings, fastening means extending through the block and plate for holding the same together, with the plate in contact with the under faces of the heads of the teeth, a metallic socket provided at its lower end with a pair of diverging arms having their free ends inserted between the rear edges of the block and plate and riveted to the latter at such point, and a handle having its lower end fitted in said socket.

In testimony whereof, I affix my signature, in presence of two witnesses.

ADA S. BURCKHALTER.

Witnesses:
C. N. BURCKHALTER,
J. O. PATTERSON, Jr.